(12) United States Patent
Lai

(10) Patent No.: US 9,908,220 B2
(45) Date of Patent: Mar. 6, 2018

(54) DETACHABLE TOOL ASSEMBLY FOR SCREWDRIVER

(71) Applicant: Jin-Tsai Lai, Taichung (TW)

(72) Inventor: Jin-Tsai Lai, Taichung (TW)

(73) Assignee: Worthtek Co. Ltd., Taichung (TW)

( * ) Notice: Subject to any disclaimer, the term of this patent is extended or adjusted under 35 U.S.C. 154(b) by 393 days.

(21) Appl. No.: 14/827,981

(22) Filed: Aug. 17, 2015

(65) Prior Publication Data

US 2017/0050301 A1    Feb. 23, 2017

(51) Int. Cl.
| | |
|---|---|
| *B25B 23/00* | (2006.01) |
| *B23B 31/16* | (2006.01) |
| *B25B 15/02* | (2006.01) |
| *B23B 31/107* | (2006.01) |

(52) U.S. Cl.
CPC ...... *B25B 23/0035* (2013.01); *B23B 31/1071* (2013.01); *B25B 15/02* (2013.01); *B25B 23/0042* (2013.01)

(58) Field of Classification Search
CPC ............ B25B 23/0035; B25B 23/0042; B23B 31/1071; B25G 3/20; B25G 3/24; B25G 3/30
USPC .............. 81/438; 279/56, 57, 69, 74–76, 82
See application file for complete search history.

(56) References Cited

U.S. PATENT DOCUMENTS

| | | | |
|---|---|---|---|
| 3,185,493 A * | 5/1965 | Chadwick ........... | B25B 23/0035 279/81 |
| 8,622,400 B2 * | 1/2014 | Lin ..................... | B23B 31/1071 279/14 |

* cited by examiner

*Primary Examiner* — Bryan R Muller
(74) *Attorney, Agent, or Firm* — Che-Yang Chen; Law Offices of Scott Warmuth (57) ABSTRACT

A detachable tool assembly for a screwdriver may include a main body, a sleeve, an extending tube, a first controlling piece, a second controlling piece, an operating unit, and at least a tool rod. The extending tube can be rotated round the main body, so the user can hold the extending tube by hand to provide support when screwing process. Also, it is convenient for user to replace the tool head, while the user has no need to use two hands to remove or place the tool heads, but one hand holding the handle rotates the operating unit to achieve the replacing process.

8 Claims, 8 Drawing Sheets

DETACHABLE TOOL ASSEMBLY FOR SCREWDRIVER

FIELD OF THE INVENTION

The present invention relates to a tool assembly more particularly to a detachable tool assembly for screwdriver that can be replaced quickly.

BACKGROUND OF THE INVENTION

Figure 10:
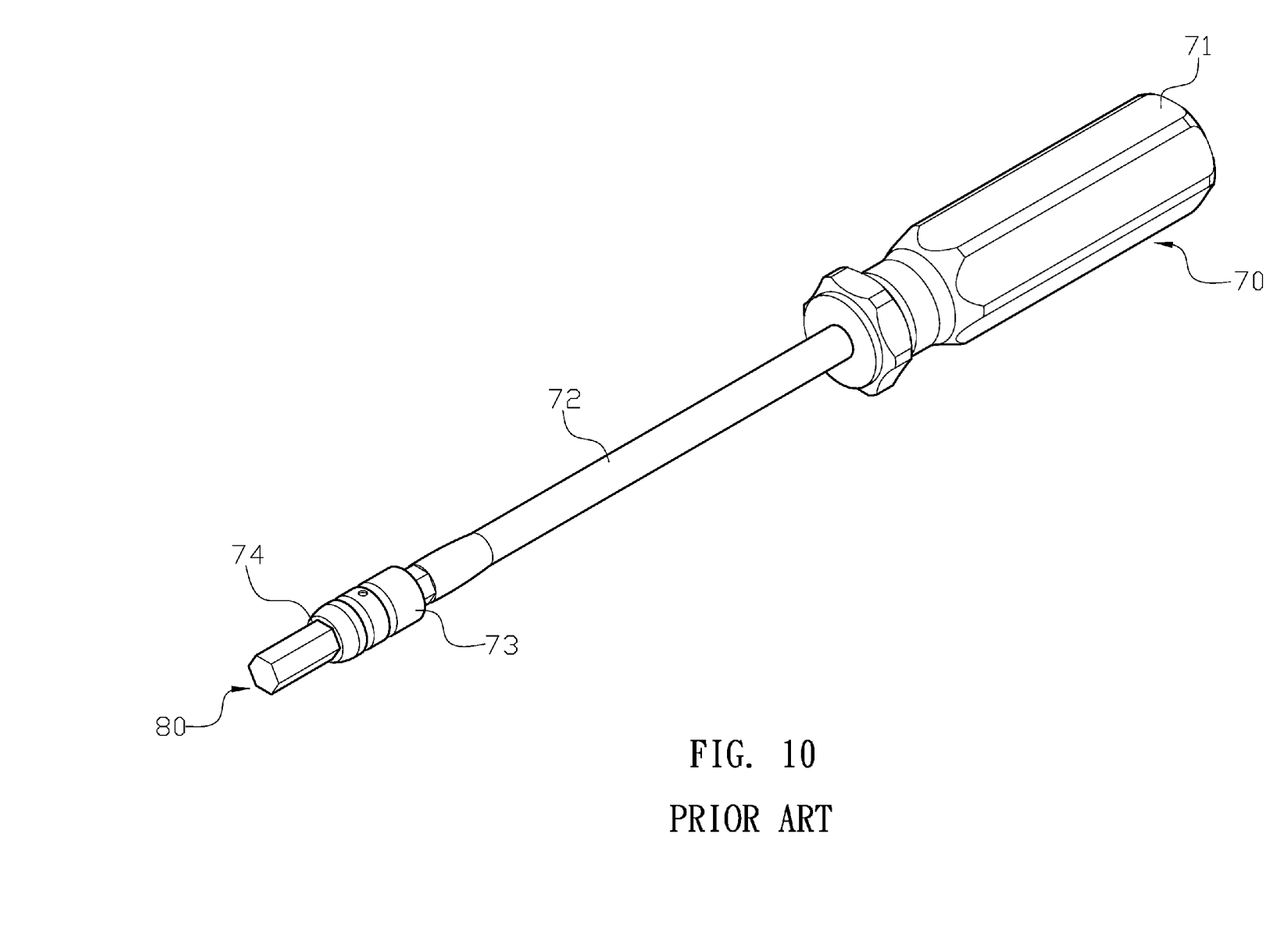
FIG. 10 is a prior art.

Referring to FIG. 10, a conventional screwdriver (70) with a removable tool head comprises of a handle (71), a rod (72) and a sleeve (73). A first end of the rod (73) is mounted into the handle (71), and a second end thereof is connected to the sleeve (73). A tool slot (74) is formed at a front end of the sleeve (73) to receive different tool heads (80).

However, conventional screwdriver (70) is disadvantageous because: (i) when screwing process, the sleeve (73) is driven by rod (72), and is rotated with the rod (72) simultaneously. Thus, the user cannot hold the sleeve (73) by hand to provide support; and (ii) it is inconvenient for user to replace the tool head (80) of the screwdriver, while the user has to use one hand to push the sleeve (73) and use the other hand to remove or place the tool heads (80) to achieve the replacing process. Therefore, there remains a need for a new and improved design for a detachable tool assembly for screwdriver to overcome the problems presented above.

SUMMARY OF THE INVENTION

The present invention provides a detachable tool assembly for screwdriver, which comprises of a main body, a sleeve, an extending tube, a first controlling piece, a second controlling piece, an operating unit and at least a tool rod. The main body comprises of a handle, and a connecting rod is connected to an upper end thereof. A threaded section is formed at a lower end periphery of the connecting rod, and a plurality of locating slot is formed in pairs at different heights of a periphery of the threaded section. A polygonal tool slot formed at an upper end of the connecting rod is configured to receive the tool rod, and an outer periphery of the connecting rod has two locating balls which can enter the neck of the tool slot. The sleeve is mounted on an outer periphery of the threaded section, and two openings are formed at two sides of the sleeve. Each of two outer peripheries of the openings is shaped into a ladder-shape to provide edge for mounting the first controlling piece and the second controlling piece respectively, and each of the openings has a horizontal first engaging portion formed at an inner periphery thereof. The extending tube comprises a first end and a second end, and a connecting groove is formed at an outer periphery of the first end while a connecting hole is formed at the second end, and a blocking ring is secured at an inner periphery of the connecting hole. The extending tube which is hollow is mounted on an outer periphery of the connecting rod, and the first end of the extending tube is inserted into the sleeve, resulting in the connecting groove located under the openings. By moving the extending tube on the connecting rod, the blocking ring can contact and press the locating balls inward or detach from the locating balls. The first controlling piece and the second controlling piece are arc-shaped, and two horizontal second engaging portions are formed at outer peripheries of the first controlling piece and the second controlling piece respectively. Each of the first controlling piece and the second controlling piece has a blocking piece which is formed at a central portion thereof along a curved inner surface, and has two protruding pieces which are formed at two lateral edges thereof respectively. When the first controlling piece and the second controlling piece are mounted and secured on the two openings of the sleeve respectively, the blocking pieces thereof are engaged with a spiral groove of the threaded section, and the protruding pieces thereof are engaged with the connecting groove of the extending tube. Also, a through hole formed on the second controlling piece is located beside the blocking piece to provide a space for the extension thereof, and two positioning pins located beside the through hole protrude from two upper lateral edges of the blocking piece respectively. The operating unit which is a hollow tube is mounted on an outer periphery of the sleeve to cover the sleeve, the first controlling piece and the second controlling piece, and can be rotated around the sleeve. By connecting a connecting portion of the operating unit to the first engaging portions of the sleeve and the second engaging portions of the first controlling piece and the second controlling piece, the sleeve, the first controlling piece and the second controlling piece which are engaged with the spiral groove of the threaded section can be driven by operating unit to rotate. The tool rod comprises a rod body, and a connecting section is located at an end thereof, and an outer periphery of the connecting section is shaped into a polygon. Also, a tool head is connected to another end of the rod body. A plurality of annular slots is formed at the outer periphery of the rod body to connect to the locating balls. When the connecting section of the rod body is inserted into the tool slot of the main body, the annular slots are connected to locating ball, resulting in the tool rod securing on the tool slot of the main body. An insulating layer is covered around the outer periphery of the rod body.

Comparing with conventional detachable tool assembly for screwdriver, the present invention is advantageous because: (i) the extending tube can be rotated round the main body, so the user can hold the extending tube by hand to provide support when screwing process; and (ii) it is convenient for user to replace the tool head, while the user has no need to use two hands to remove or place the tool heads, but one hand holding the handle rotates the operating unit to achieve the replacing process.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a detachable tool assembly for screwdriver, which comprises of a main body (10), a sleeve (20), an extending tube (30), a first controlling piece (40), a second controlling piece (400), an operating unit (50) and at least a tool rod (60). The main body (10) comprises of a handle (11), and a connecting rod (12) is connected to an upper end thereof. A threaded section (13) is formed at a lower end periphery of the connecting rod (12), and a plurality of locating slots (14) is formed in pairs at different heights of a periphery thereof. A polygonal tool slot (15) formed at an upper end of the connecting rod (12) is configured to receive the tool rod (60), and an outer periphery thereof has two locating balls (16) which can enter the neck of the tool slot (15). The sleeve (20) is mounted on an outer periphery of the threaded section (13), and two openings (21) are formed at two sides thereof. Each of two outer peripheries of the openings (21) is shaped into a ladder-shape to provide edge for mounting the first controlling piece (40) and the second controlling piece (400) respectively, and each of openings (21) has a horizontal first engaging portions (22) formed at inner periphery thereof. The extending tube (30) comprises a first end and a second end, and a connecting groove (31) is formed at an outer periphery of the first end while a connecting hole (32) is formed at the second end, and a blocking ring (33) is secured at an inner periphery of the connecting hole (32). The extending tube (30) which is hollow is mounted on an outer periphery of the connecting rod (12), and the first end thereof is inserted into the sleeve (20), resulting in the connecting groove (31) located under the openings (21). By moving the extending tube (30) on the connecting rod (12), the blocking ring (33) can contact and press the locating balls (16) inward or detach from the locating balls (16). The first controlling piece (40) and the second controlling piece (400) are arc-shaped, and two horizontal second engaging portions (41) are formed at outer peripheries of the first controlling piece (40) and the second controlling piece (400) respectively. Each of the first controlling piece (40) and the second controlling piece (400) has a blocking piece (42) which is formed at a central portion thereof along a curved inner surface, and has two protruding pieces (43) which are formed at two lateral edges thereof respectively. When the first controlling piece (40) and the second controlling piece (400) are mounted and secured on the two openings (21) of the sleeve (20) respectively, the blocking pieces (42) thereof are engaged with a spiral groove of the threaded section (13), and the protruding pieces (43) thereof are engaged with the connecting groove (31) of the extending tube (30). Also, a through hole (44) formed on the second controlling piece (400) is located beside the blocking piece (42) to provide a space for the extension thereof, and two positioning pins (45) located beside the through hole (44) protrude from two upper lateral edges of the blocking piece (42) respectively. The operating unit (50) which is a hollow tube is mounted on an outer periphery of the sleeve (20) to cover the sleeve (20), the first controlling piece (40) and the second controlling piece (400), and can be rotated around the sleeve (20). By connecting a connecting portion (51) of the operating unit (50) to the first engaging portions (22) of the sleeve (20) and the second engaging portions (41) of the first controlling piece (40) and the second controlling piece (400), the sleeve (20), the first controlling piece (40) and the second controlling piece (400) which are engaged with the spiral groove of the threaded section (13) can be driven by operating unit (50) to rotate. The tool rod (60) comprises a rod body (61), and a connecting section (62) is located at an end thereof, and an outer periphery of the connecting section (62) is shaped into a polygon. Also, a tool head (63) is connected to another end of the rod body (61). A plurality of annular slots (64) is formed at the outer periphery of the rod body (61) to connect to the locating balls (16). When the connecting section (62) of the rod body (61) is inserted into the tool slot (15) of the main body (10), the annular slots (64) are connected to locating ball (16), resulting in the tool rod (60) securing on the tool slot (15) of the main body (10). An insulating layer (65) is covered around the outer periphery of the rod body (61).

In one embodiment, a protruding block and slots are used to engage the connecting portion (51) of the operating unit (50) with the first engaging portions (22) of the sleeve (20), and to engage the connecting portion (51) of the operating unit (50) with the second engaging portions (41) of the first controlling piece (40) and the second controlling piece (400), which can achieve to transmit more rotating force from the operating unit (50) to the sleeve (20), the first engaging portions (22) and the second engaging portions (41).

In other embodiment, the outer periphery of the threaded section (13) on the main body (10) has two pair of locating slots (14) formed in different heights which are configured to receive the positioning pins (45) protruding from the two lateral edges of the blocking piece (42). Two of the positioning pins (45) can connect to the pair of the locating slots (14) at the same height.

A flange (17) formed at a lower end of the threaded section (13) bears against each of lower protruding pieces (43) on the first controlling piece (40) and the second controlling piece (400) to limit the max spin move distance of the sleeve (20), the first controlling piece (40), the second controlling piece (400) and the operating unit (50).

Figure 1:
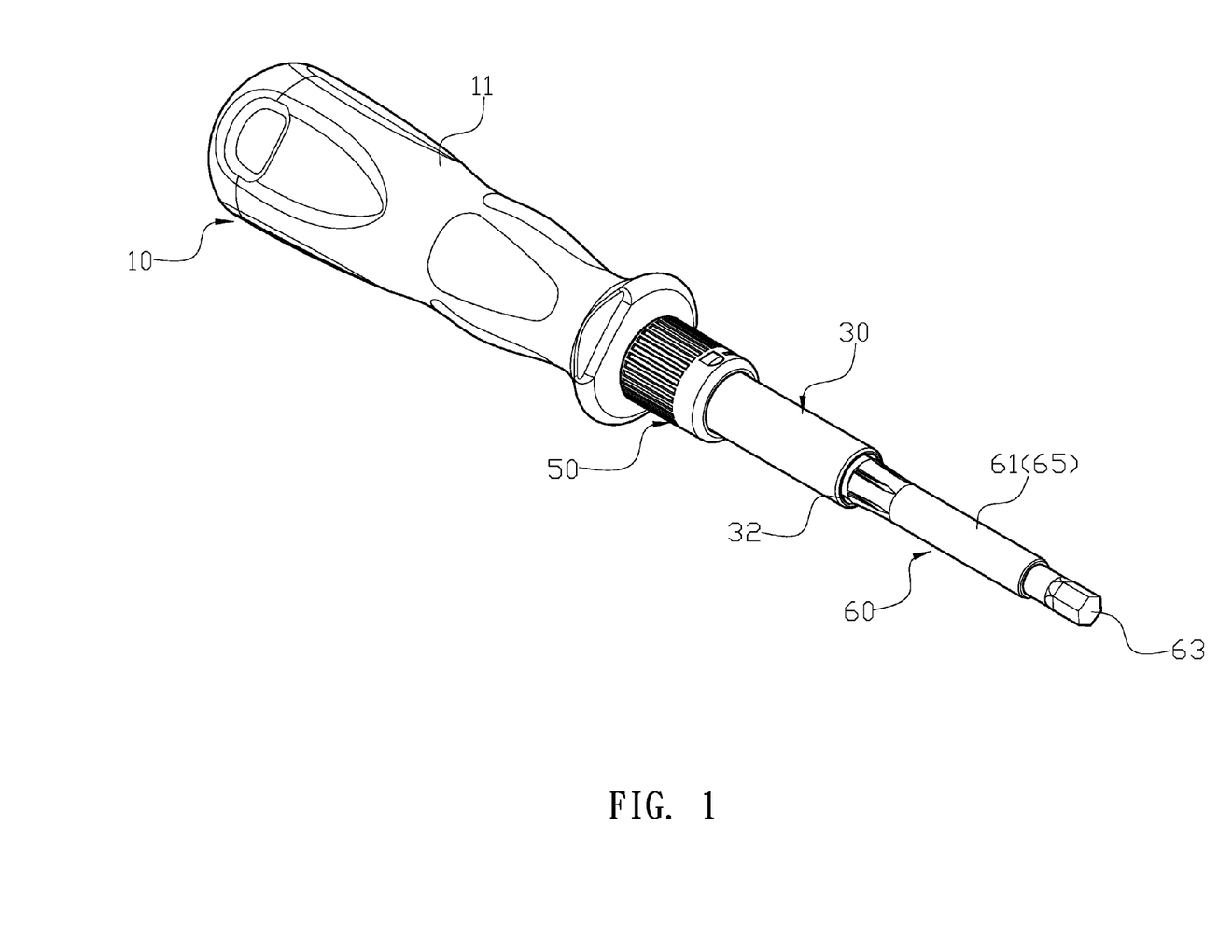
FIG. 1 is a three-dimensional view of the detachable tool assembly for screwdriver of the present invention.
Figures 2, 3:
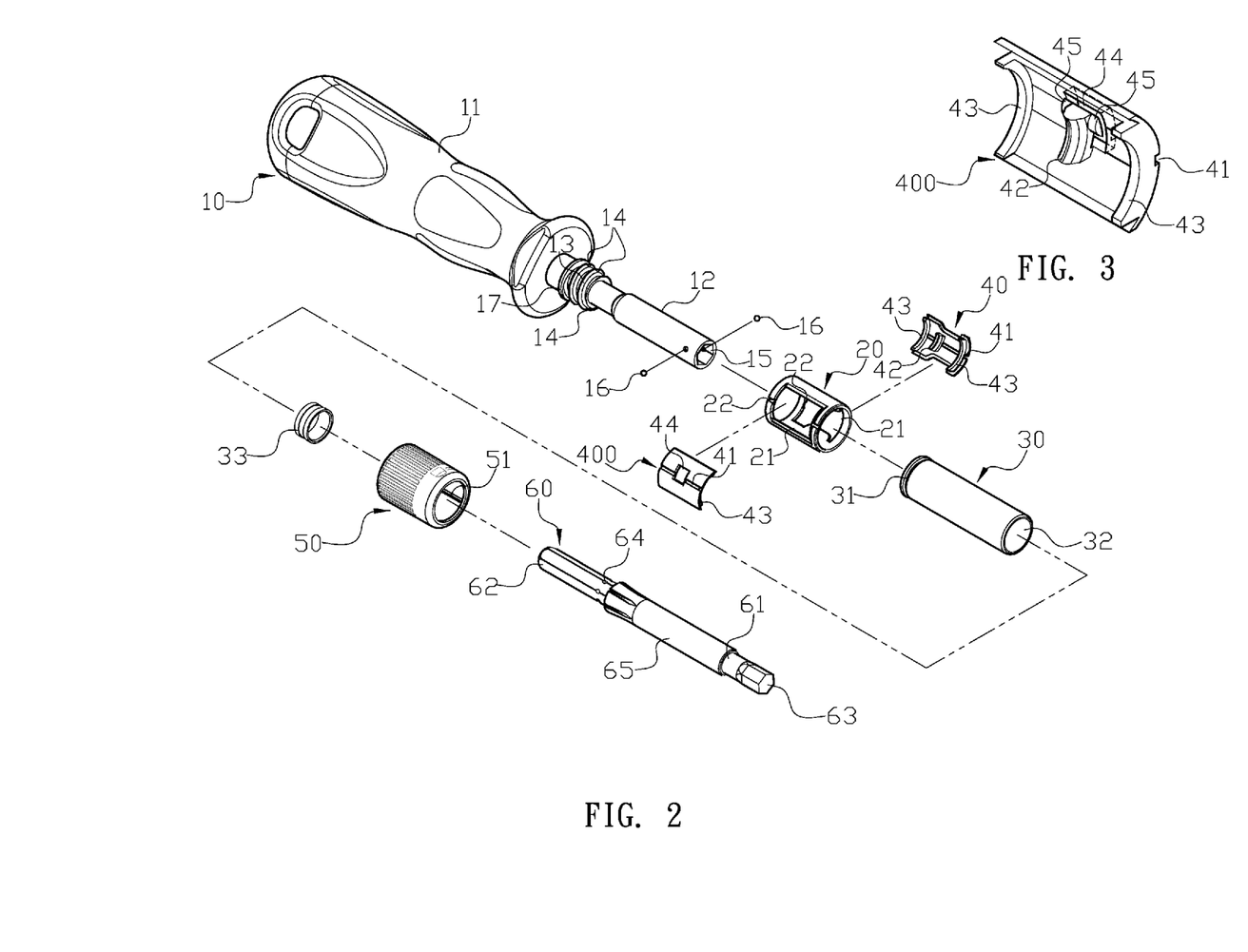
FIG. 2 is a three-dimensional exploded view of the detachable tool assembly for screwdriver of the present invention.
FIG. 3 is a three-dimensional enlarged view from another angle of the second controlling piece of the detachable tool assembly for screwdriver of the present invention.
Figure 4:
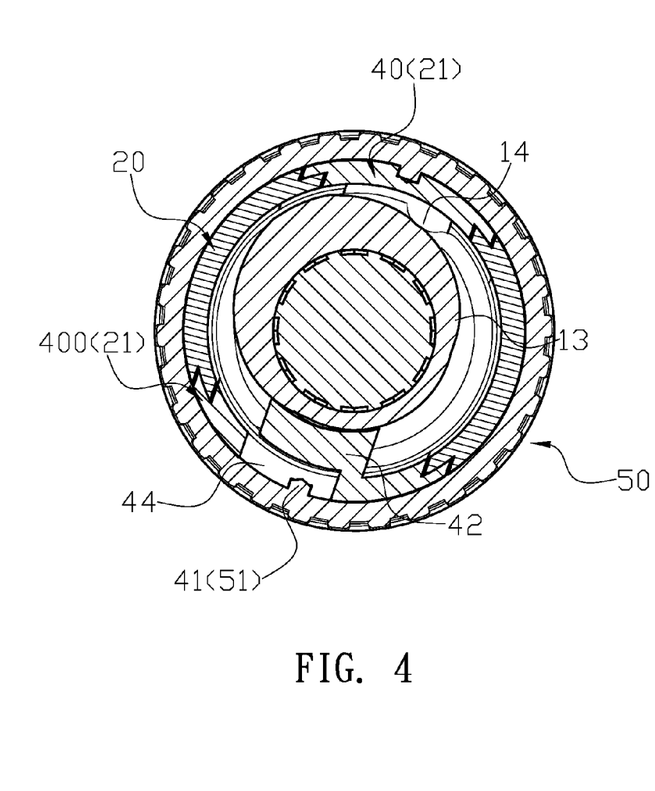
FIG. 4 is a sectional view of the detachable tool assembly for screwdriver of the present invention.
Figure 5:
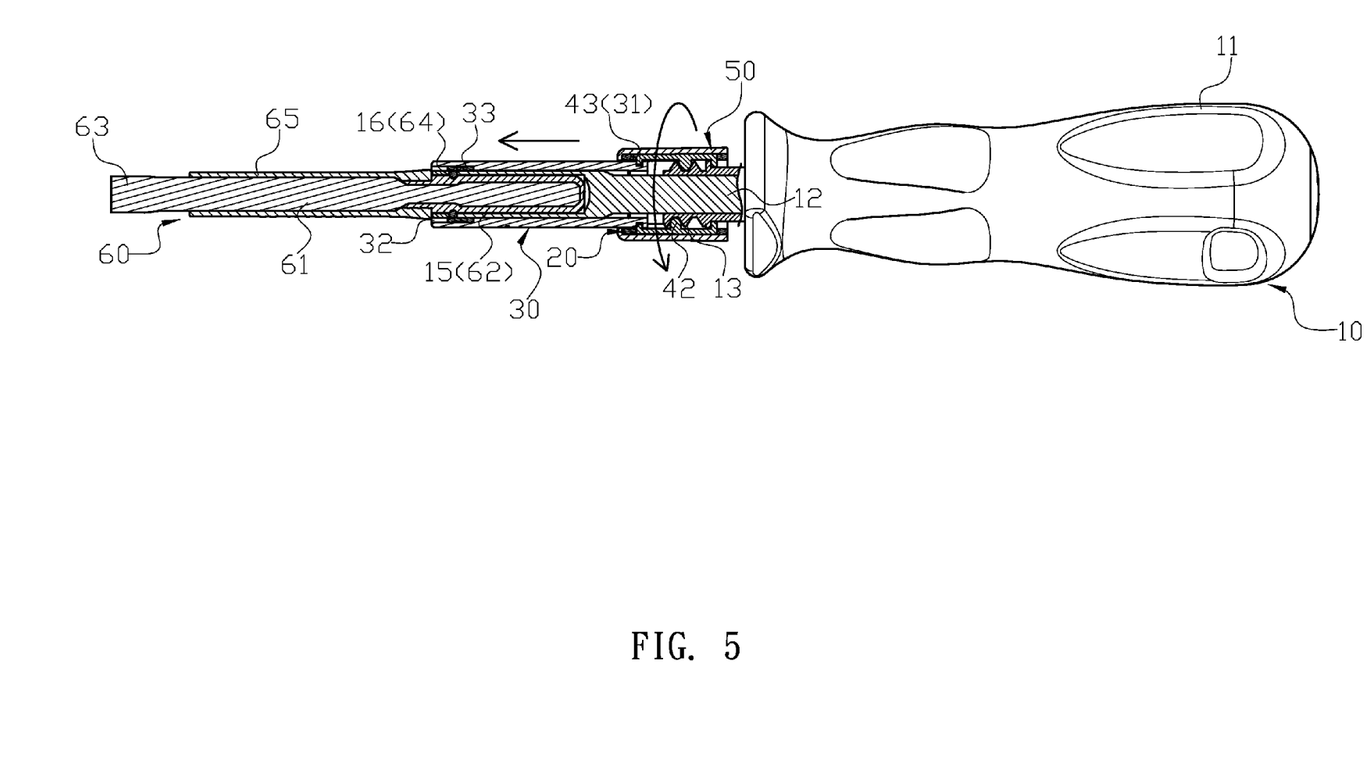
FIG. 5 is a schematic view of securing the tool rod on the main body of the detachable tool assembly for screwdriver in the present invention.
Figure 6:
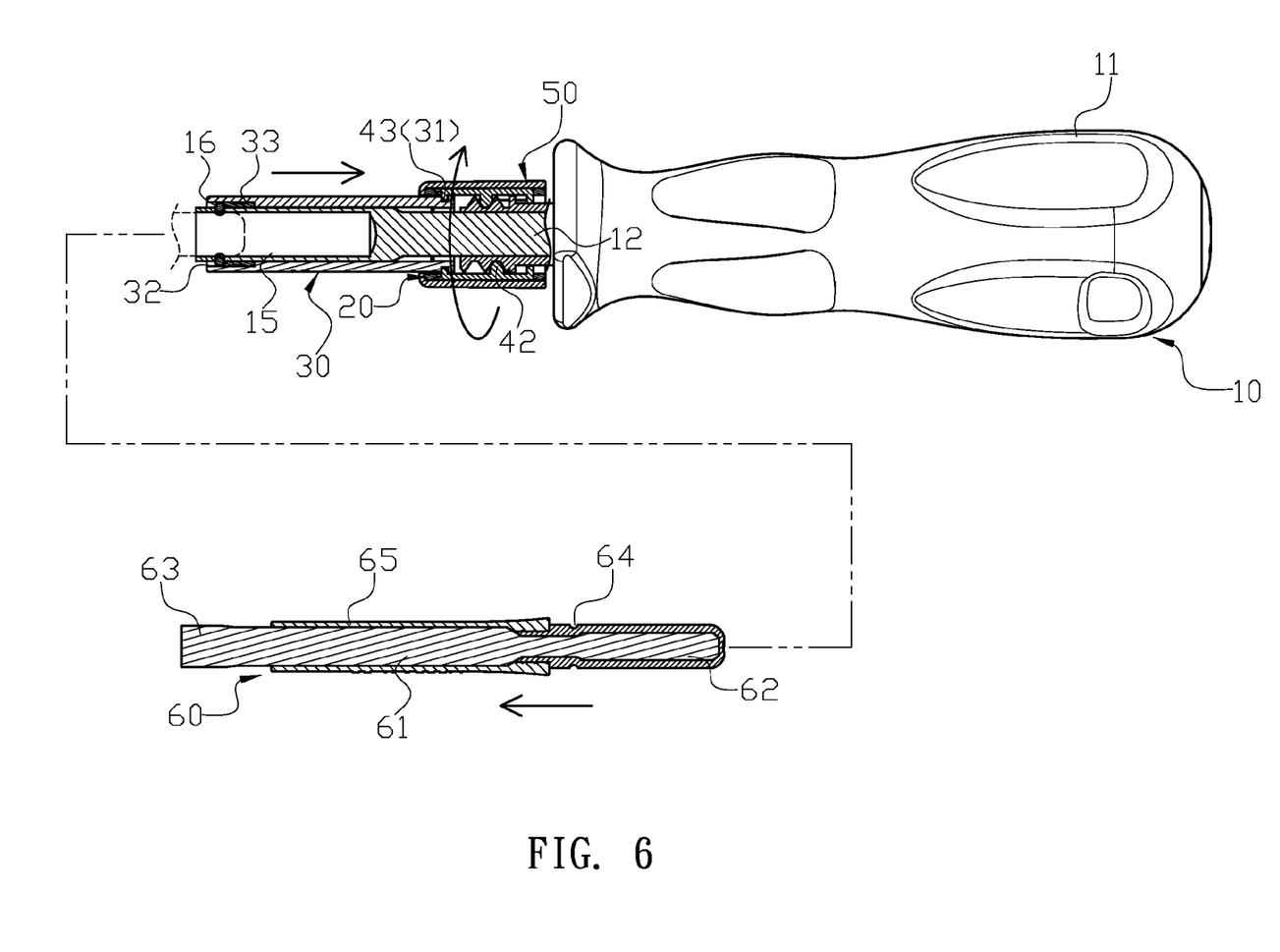
FIG. 6 is a schematic view of replacing the tool rod of the detachable tool assembly for screwdriver in the present invention.
Figure 7:
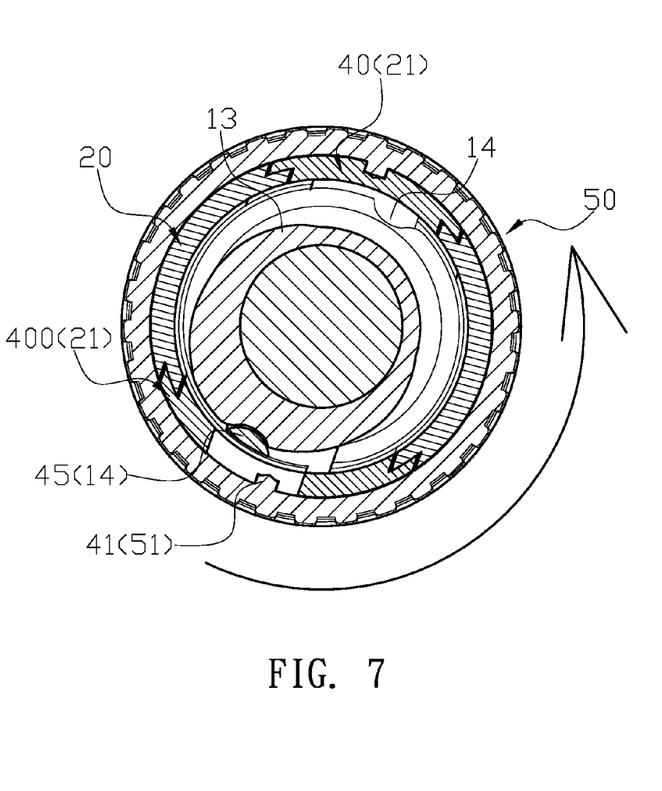
FIG. 7 is a schematic view of connecting the positioning pins into the locating slot of the detachable tool assembly for screwdriver in the present invention.

Referring to FIG. 5, in actual application, the tool rod (60) is connected to main body (10) by inserting the connecting section (62) thereof through the connecting hole (32) of the extending tube (30) into the tool slot (15) formed at the front end of the connecting rod (12) of the main body (10). Since the connection between the connecting portion (51) and the first engaging portions (22), the connecting portion (51) and the second engaging portions (41), and the blocking piece (42) and the spiral groove of the threaded section (13), the sleeve (20), the first controlling piece (30) and the second controlling piece (400) can be driven by the operating unit (50) to rotate in one direction and move forward with the operating unit (50). By engaging the protruding pieces (43) of the first and second controlling piece (40) (400) with the connecting groove (31) of the extending tube (30), the extending tube (30) can be pushed forward simultaneously when the operating unit (50) is moved and rotated. Also, the locating balls (16) are pressed by the blocking ring (33) to move into the neck of tool slot (15), and are secured inside of the annular slots (64) to prevent the tool rod (60) from being loosed. On the other hand, when the tool rod (60) need to be replaced, the operating unit (50) is rotated in opposite direction to drive the protruding pieces (43) of the first and second controlling piece (40)(400), and pull the extending tube (30) backward to detach the blocking ring (33) of the connecting hole (32) from the locating balls (16). As a result, the locating balls (16) are released to move out of the tool slot (15) and the tool head (60) can be replaced (as shown in FIG. 6). When the operating unit (50) is rotated, the positioning pins (45) of the second controlling piece (400) engaged with the two locating slots (14) (as shown in FIG. 7) are configured to limit the max spin move distance of the operating unit (50).

Figure 8:
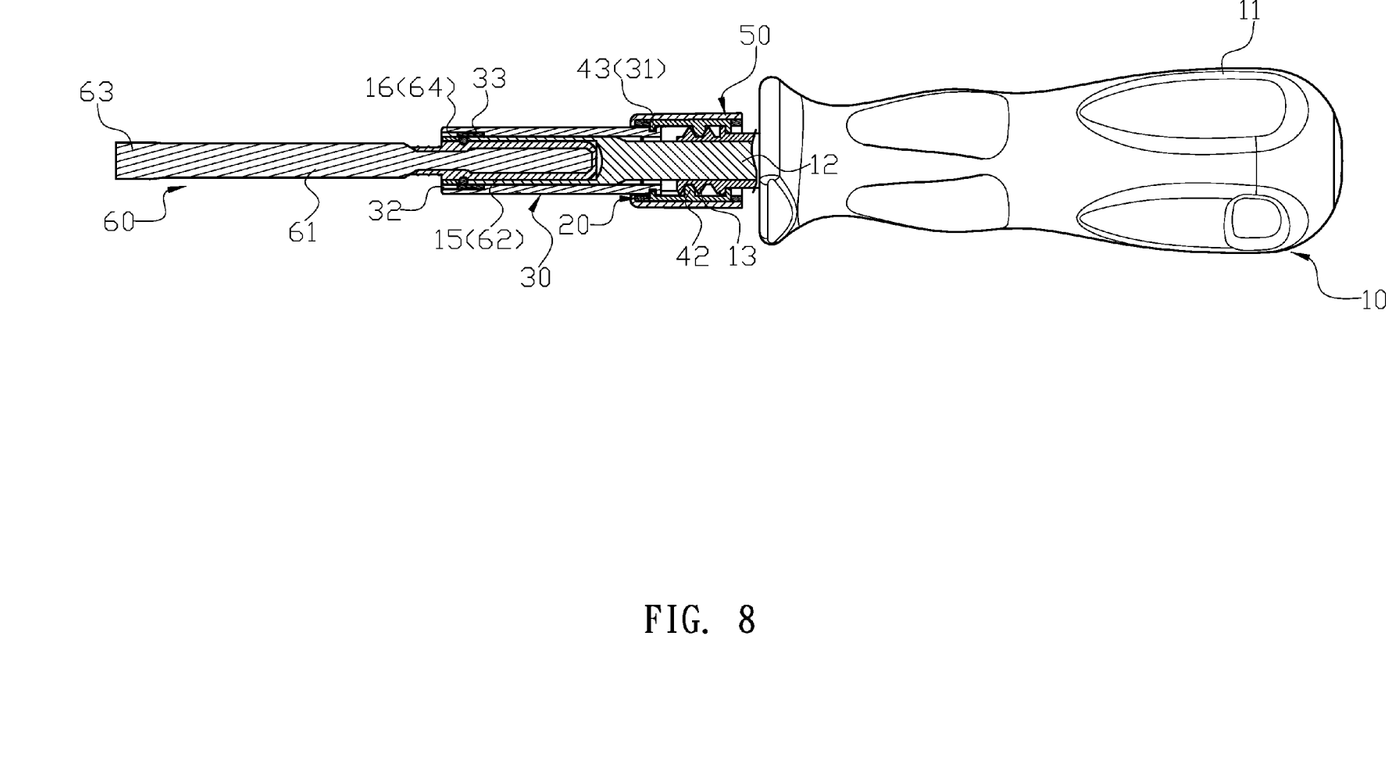
FIG. 8 is a schematic view of another embodiment of the detachable tool assembly for screwdriver in the present invention.
Figure 9:
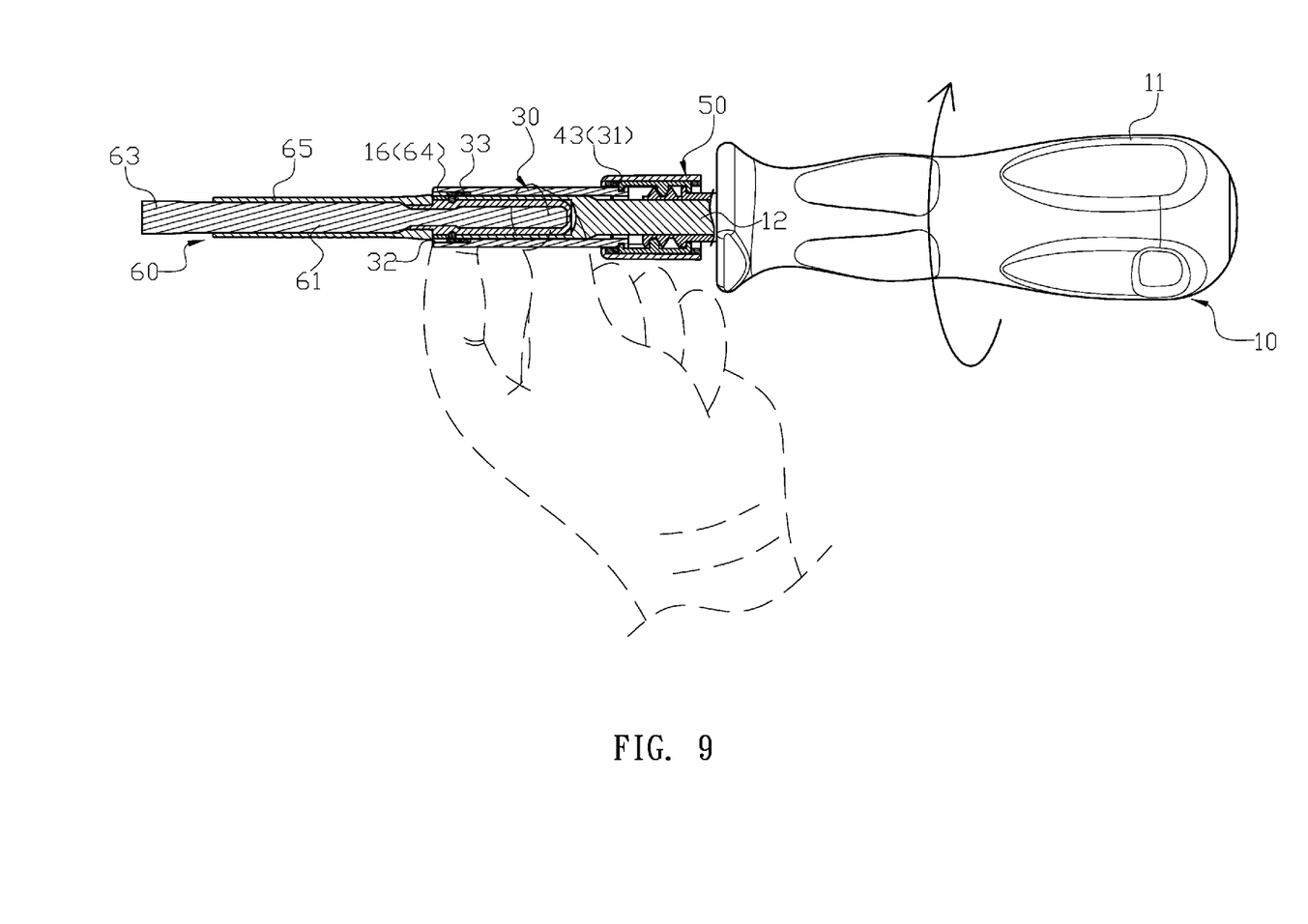
FIG. 9 is a schematic view of the extending tube providing support for user of the detachable tool assembly for screwdriver in the present invention.

Referring to FIG. 8, an outer periphery of the rod body (61) of the tool rod (60) can have no covering the insulating layer (65).

Comparing with conventional detachable tool assembly for screwdriver, the present invention is advantageous because: (i) the extending tube (30) can be rotated round the main body (10), so the user can hold the extending tube (30) by hand to provide support when screwing process; and (ii) it is convenient for user to replace the tool head (60), while the user has no need to use two hands to remove or place the tool heads (60), but one hand holding the handle (11) rotates the operating unit (50) to achieve the replacing process.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A detachable tool assembly for a screwdriver comprising:

a main body comprising of a handle, and a connecting rod connected to an upper end of the handle, a threaded section formed at a lower end periphery of the connecting rod, and a plurality of locating slots formed at a periphery of the threaded section, a polygonal tool slot formed at an upper end of the connecting rod configured to receive the tool rod, and an outer periphery of the connecting rod having a locating unit which can enter into the tool slot;

a sleeve mounted on an outer periphery of the threaded section, and two openings formed at two sides of the sleeve to engage with a first controlling piece and a second controlling piece, each of the two openings having a horizontal first engaging portion formed at an outer periphery thereof;

a hollow extending tube comprising a first end and a second end, and a connecting groove formed at an outer periphery of the first end, a connecting hole formed at the second end, and a blocking ring secured at an inner periphery of the connecting hole, the hollow extending tube mounted on an outer periphery of the connecting rod, and the first end of the extending tube inserted into the sleeve, resulting in the connecting groove located under the openings, wherein by moving the extending tube on the connecting rod, the blocking ring can contact and press the locating unit inward or detach from the locating unit;

the first controlling piece and the second controlling piece being arc-shaped, and two horizontal second engaging portions formed at outer peripheries of the first controlling piece and the second controlling piece respectively, each of the first controlling piece and the second controlling piece having a blocking piece formed at a central portion thereof along a curved inner surface, and each of the first controlling piece and the second controlling piece having two protruding pieces formed at respective lateral ends thereof, when the first controlling piece and the second controlling piece are mounted and secured on the two openings of the sleeve respectively, the blocking pieces of the first controlling piece and the second controlling piece engaged with a spiral groove of the threaded section, and protruding pieces at a first end of the first controlling piece and the second controlling piece engaged with the connecting groove of the extending tube, a through hole formed on the second controlling piece located beside the blocking piece to provide a space for the extension of the blocking piece, and two positioning pins located beside the through hole protruding from two upper lateral edges of the blocking piece respectively;

an operating unit being a hollow tube mounted on an outer periphery of the sleeve to cover the sleeve, the first controlling piece and the second controlling piece for rotation around the connecting rod, connecting portions of the operating unit for connecting to the first engaging portions of the sleeve and the second engaging portions of the first controlling piece and the second controlling piece, wherein the sleeve, the first controlling piece and the second controlling piece which are engaged with the spiral groove of the threaded section can be driven by the operating unit to rotate; and a tool rod comprising a rod body, and a connecting section located at an end thereof, and an outer periphery of the connecting section shaped into a polygon, a tool head connected to another end of the rod body, a plurality of slots formed at the outer periphery of the rod body to connect to the locating balls, wherein when the connecting section of the rod body is inserted into the tool slot of the main body, the annular slots are connected to the locating unit, resulting in the tool rod being secured in the tool slot of the main body.

2. The detachable tool assembly for screwdriver of claim 1, wherein said connecting portions are each in the form of a protruding block and each of the engaging portions of the sleeve, first controlling piece and second controlling piece are in the form of slots to engage the connecting portions of the operating unit with the first engaging portions of the sleeve, the second engaging portions of the first controlling piece and the second controlling piece, respectively.

3. The detachable tool assembly for screwdriver of claim 1, wherein said plurality of locating slots comprises two pair of locating slots formed in different heights which are configured to receive the positioning pins protruding from the two lateral edges of the blocking piece.

4. The detachable tool assembly for screwdriver of claim 1, wherein a flange formed at a lower end of the threaded section bears against each of lower protruding pieces of the first controlling piece and the second controlling piece to limit the maximum axial movement of the sleeve, the first controlling piece, the second controlling piece and the operating unit along the connecting rod.

5. The detachable tool assembly for screwdriver of claim 1, wherein at least one of the openings in the sleeve is formed as a ladder-shape.

6. The detachable tool assembly for screwdriver of claim 1, wherein an insulating layer is covered around the outer periphery of the rod body.

7. The detachable tool assembly for screwdriver of claim 1, wherein the locating unit comprises at least a locating ball.

8. The detachable tool assembly for screwdriver of claim 1, wherein the extending tube is made of an insulating material.

\* \* \* \* \*